May 6, 1969

V. E. SWENSON 3,442,067

AIR CLEANER

Filed Feb. 26, 1968

INVENTOR.
V. E. SWENSON

BY

*R L Hollister*

AGENT

United States Patent Office 3,442,067
Patented May 6, 1969

3,442,067
AIR CLEANER
Victor Eugene Swenson, Cedar Falls, Iowa, assignor to Deere & Company, Moline, Ill., a corporation of Delaware
Filed Feb. 26, 1968, Ser. No. 708,266
Int. Cl. B01d 46/24, 27/00
U.S. Cl. 55—482                                4 Claims

ABSTRACT OF THE DISCLOSURE

An air cleaner having a primary filter element and a safety filter element mounted end to end within the cleaner casing. The cleaner casing is divided into two chambers by a bulkhead positioned within the cleaner casing between the two filter elements. The bulkhead is provided with a central opening to provide for the flow of air from one chamber to the other. Each filter element is provided with its own individual seal which bears against the bulkhead so that air passing through the cleaner casing must pass through two filter elements or two seals. In the event of the rupture of the primary filter element or its seal, air passing through the cleaner casing will still be required to pass through the safety filter element.

Background of the invention

The present invention relates to an air cleaner for use with internal-combustion engines and more particularly to an air cleaner of the type having a primary filter element and a safety filter element.

In the most common form of previously known air cleaners of the type having primary and safety filter elements, the safety element is mounted coaxially within the primary element. This form of air cleaner had the disadvantage of requiring an elbow at the end of the cleaner in order to direct air flow to the sides of the cleaner. Also, in this form of air cleaner, when the access cover of the cleaner was removed to service the primary filter element, access to the safety element was so facilitated that the safety element would also be serviced. This resulted in a waste of time since the safety element requires servicing only in the event of the failure of the primary element. Furthermore, the increased handling of the safety element as a result of continual servicing increased the possibility of the safety element being damaged. An additional disadvantage of this form of air cleaner is that the removal of the primary filter element often resulted in the spilling of dirt on the safety filter element so that cleaning of the safety element was required.

Summary of the invention

It is an object of the present invention to provide an air cleaner of the type having a primary filter element and a safety filter element and in which removal of the cleaner access cover for servicing of the primary filter element does not directly facilitate servicing of the safety filter element.

Another object of the present invention is to provide an air cleaner of the type having primary and safety filter elements and which, when provided with a side air outlet, is of a reduced overall length as compared to prior air cleaners provided with an air outlet which directs the flow of air to the side of the cleaner.

Still another object of the present invention is to provide an air cleaner of the type having primary and safety filter elements and in which the safety filter element is of a length substantially less than the length of the primary filter element.

A further object of the present invention is to provide an air cleaner of the type having primary and safety filter elements and in which each filter element is provided with its own seal so that air passing through the cleaner will be required to pass through two filter elements or two seals.

The above objects are accomplished by providing an air cleaner with the primary and safety filter elements mounted end to end within the cleaner casing. The casing is divided into two chambers by a bulkhead mounted within the casing between the two filter elements. Each filter is provided with a seal which seats against the bulkhead so that as air flows through the casing, it must pass through either a filter element or a seal on each side of the bulkhead.

The chamber on the air outlet side of the bulkhead is substantially smaller than the chamber on the air inlet side of the bulkhead, and only large enough to provide sufficient casing wall surface on which to provide an air outlet which directs the flow of air to the side of the casing. The safety filter element which is substantially smaller than the primary filter element is mounted in the small chamber. The small chamber with a side air outlet requires less length than would be required by an elbow on the end of a casing having the two filter elements mounted coaxially one within the other. Also, by mounting the safety filter element within the small chamber rather than within the primary filter element in the large chamber, the safety element serves to dampen the air turbulence which tends to occur in the small chamber. Since a violent air turbulence in the small chamber would tend to restrict the flow of air through the small chamber, the mounting of the safety element in the small chamber facilitates the flow of air through the small chamber.

To discourage the servicing of the safety filter element each time the primary filter is serviced, the bulkhead in one form of the invention is removably secured within the casing with bolts or the like and the safety filter element is larger than the opening provided in the bulkhead. Therefore, before the safety filter element can be serviced after the casing access cover has been removed and the primary filter element withdrawn, the bolts securing the bulkhead in place must be removed. In a second form of the invention, the safety element is bolted to a fixed bulkhead so that the bolts have to be removed before the safety element can be serviced.

The above objects and advantages along with other objects and advantages will become more apparent to those skilled in the art from a reading of the following detailed description taken in conjunction with the accompanying drawings.

Description of the preferred embodiments

Figure 1:
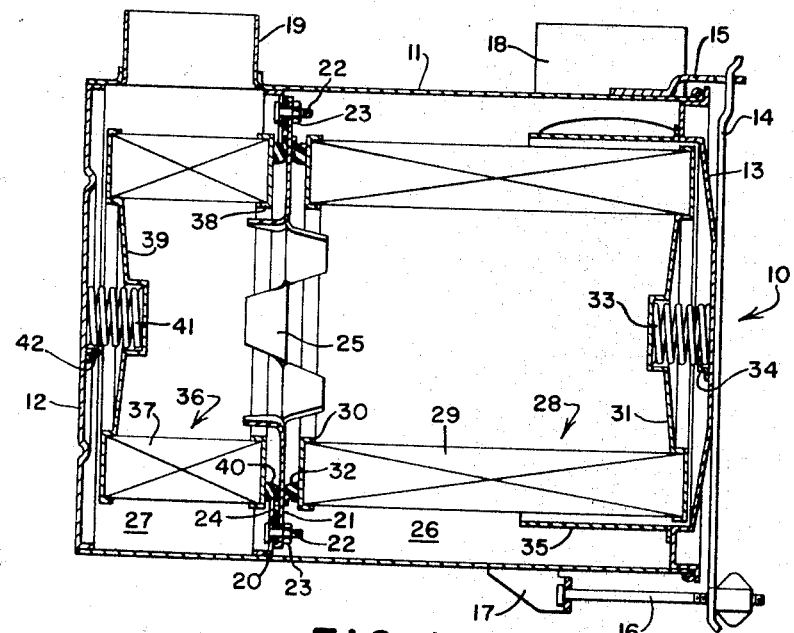
FIG. 1 is a cross sectional view of an air cleaner constructed in accordance with the present invention.

Referring now to the drawings and in particular FIG. 1, one form of an air cleaner according to the present invention is indicated generally by the numeral 10. The air cleaner 10 includes a cylindrical casing 11 closed at one end by a wall 12 which is secured and sealed to the casing 11 in any suitable manner such as welding. The other end of the casing 11 is normally closed by a removable cover 13. The access cover 13 is held in place by a cross member 14 which pivotally engages a bracket 15 secured to one side of the casing and is held in a cover-engaging position by a bolt 16 which is mounted on the opposite side of the casing 11 by a bracket 17. A tangential air inlet opening 18 is provided in the casing 11 adjacent the end provided with the removable cover, and a radially directed air outlet opening 19 is provided adjacent the opposite end to direct the flow of air to the side of the casing 11. The air inlet opening 18 does not have to be located at the end of the casing 11, but may be mounted anywhere along the length of the casing so long as it is not positioned on the opposite side of the bulkhead which will be described hereinafter. Also, the air outlet opening need not be provided in the casing 11, but may be provided in the end wall 12 if it is not required to direct the air to the side of the cleaner.

A small inwardly facing annular flange 20 is provided in the casing 11 and integrally secured and sealed to the walls thereof in any suitable manner such as welding. The annular flange 20 is mounted closely adjacent to the edge of the air outlet opening 19. A circular-shaped partition or bulkhead 21 is mounted on the annular flange 20 by bolts 22 and nuts 23. A suitable seal 24 is provided between the flange 20 and the bulkhead 21 to prevent the passage of air between the flange 20 and bulkhead 21. Preferably, the bolts 22 are secured to the annular flange 20 by spot welding or the like so that the bolts 22 will remain in position upon removal of the nuts 23. The bulkhead 21 divides the cleaner casing 11 into two chambers 26 and 27, with chamber 26 constituting a large air inlet chamber and chamber 27 constituting a small air outlet chamber. The bulkhead 21 is provided with a large central opening 25 to provide for the flow of air from the inlet opening 18 to the outlet opening 19.

A primary filter element 28 is mounted within the air inlet chamber 26. The filter element 28 includes an annular-shaped porous portion 29, an annular-shaped end cap 30 which holds the porous portion 29 in its annular shape and provides protection for the end thereof, and a combination end cap and cover 31 which entirely closes off one end of the annular-shaped porous portion 29. A sealing ring 32 is mounted on the end cap 30 and normally engages the bulkhead 21 and encircles the opening 25 provided in the bulkhead 21 so that any air entering the air inlet 18 and passing through to the central opening 25 in the bulkhead 21 must pass through the porous portion 29. The annular seal 32 is held in engagement with the bulkhead 21 by a spring 33 which acts between the end cover 31 of the filter element 28 and the removable casing cover 13. The spring 33 is held in position on the cover 13 by a bracket 34 so that when the cover 13 is removed, the spring 33 is also removed. A flange 35 which depends from the cover 13 surrounds the filter element 28 in spaced relation thereto to provide a more even distribution of air entering the inlet 18 on the porous portion 29 and to prevent erosion of the filter element caused by dirt and other contaminators entering the air cleaner and striking the filter element.

A safety filter element indicated generally at 36 is mounted within the air outlet chamber. The filter element 36 includes an annular-shaped porous portion 37, an annular-shaped end cap 38 which retains the porous portion in its annular shape and protects the end thereof, and a combination end cap and cover 39 which entirely closes off the end of the porous portion 37 from the entrance of air. A sealing ring 40 is mounted on the end cap 38 and normally engages the bulkhead 21 and encircles the opening 25 provided in the bulkhead 21 so that any air entering the chamber 27 through the opening 25 must pass through the porous portion 37 prior to leaving the chamber 27 by way of the air outlet 19. The sealing ring 40 is held in engagement with the bulkhead 21 by a spring 41 which acts between the filter element cover 39 and the end wall 12 of casing 11. The spring 41 is held in position on the end wall 12 by a bracket 42 so that when the safety filter element 36 is removed, the spring 41 remains in position on the end wall 12.

From the above description it can be seen that any air passing through the air cleaner 10 must pass through two filter elements or two seals. Therefore, should the primary filter element rupture or its seal fail, the air would still be required to pass through the safety filter element prior to entering the internal-combustion engine.

To service the above-described air cleaner, the access cover 13 is removed and the primary filter element 28 withdrawn from the casing 11 for cleaning or replacement. The safety filter element 36 is retained in position by the bulkhead 21 until the nuts 23 are removed. This is a desirable feature since the safety filter element does not require servicing unless the primary element has ruptured or its seal failed. The fact that the safety filter element 36 cannot be serviced without removing the nuts 23 will discourage the servicing of the safety filter element and therefore reduce the possibility of it being damaged by excess handling. Should the secondary filter element require servicing because of a rupture in the primary filter element or a defective seal, this will be noticed, when the primary filter element is withdrawn for servicing since the primary filter element will still be relatively clean.

Figure 2:
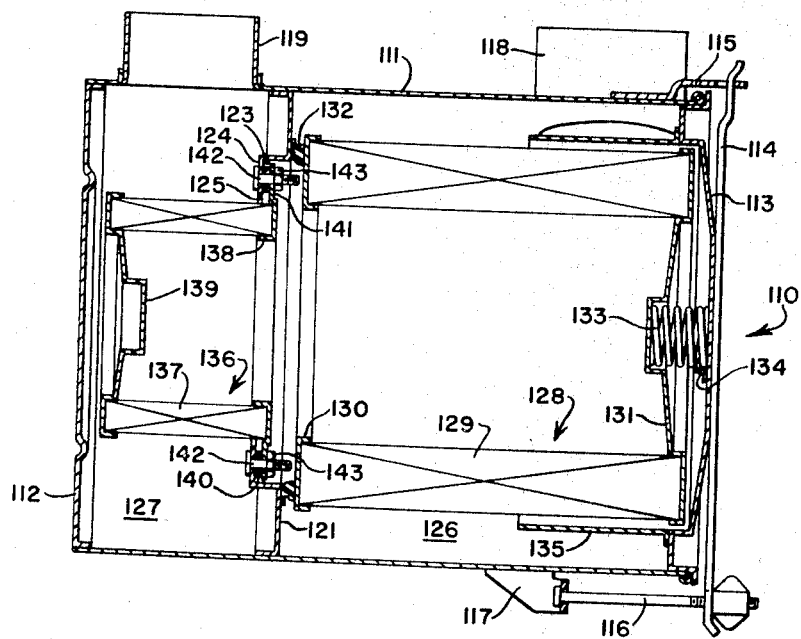
FIG. 2 is a view similar to FIG. 1, but illustrating a slightly modified form of the invention.

Referring now to FIG. 2 where a second embodiment of the invention is illustrated, the air cleaner is indicated generally at 110 and includes a cylindrical casing 111. The casing 111 is closed at one end by a wall 112 which is integrally secured and sealed to the casing 111 as by welding or the like. The other end of the casing 111 is normally closed by a removable access cover 113. The cover 113 is held in position by a cross member 114 which pivotally engages a bracket 115 secured to one side of the casing and is held in a cover-engaging position by a bolt 116 which is mounted on the other side of the casing 111 by a bracket 117. The cleaner casing 111 is provided with a tangential air inlet opening 118 adjacent the cover end and is provided with a radially directed air outlet opening adjacent the opposite end to direct the flow of air to the side of the casing. The air inlet opening 118 does not have to be located at the end of the casing 111, but may be mounted anywhere along the length of the casing so long as it is not positioned on the opposite side of the bulkhead which will be described hereinafter. Also, the air outlet opening need not be provided in the casing 111, but may be provided in the end wall 112 if it is not required to direct the air to the side of the cleaner.

A circular-shaped partition or bulkhead 121 is integrally secured and sealed within the casing 111 in a position closely adjacent the air outlet 119. The bulkhead 121 divides the casing 111 into two chambers 126 and 127, the chamber 126 constituting a large air inlet chamber, and the chamber 127 constituting a small air outlet chamber. A central opening 125 in the bulkhead 121 provides for the flow of air from one chamber to the other. Adjacent the opening 125, the bulkhead 121 is provided with a pair of reverse 90° bends to form an inwardly directed shoulder 123 and an inwardly directed flange 124 for a purpose which will be more evident hereinafter.

Mounted within the air inlet chamber 126 is a primary filter element indicated generally at 128. The filter element 128 includes an annular-shaped porous portion 129, an annular end cap 130 which maintains the porous portion 129 in its annular shape and protects the end thereof, and a combination end cap and cover 131 which completely closes off the end of the porous portion 129 from the entrance of air. A sealing ring 132 is provided on the end cap 130 and normally engages the bulkhead 121 and encircles the opening 125 provided in the bulkhead so that any air which flows from the inlet opening 118 to the opening 125 in the bulkhead 121 must pass through the porous portion 129. The seal 132 is normally kept in engagement with the bulkhead 121 by a spring 133 which acts between the end cover 131 and the access cover 113. The spring 133 is held in position on the access cover 113 by a bracket 134 so that when the cover 113 is removed, the spring 133 is also removed. A flange 135 depends from the cover 113 and surrounds the primary filter element 138 in spaced relation thereto. The flange 135 provides for the even distribution of air entering the air inlet 118 on the porous portion 129 and also protects the filter element from erosion.

A safety filter element 136 is positioned within the air inlet chamber 127 and includes an annular-shaped porous portion 137, an end cap 138 which maintains the paper 137 in its annular shape, and a combination end cap and cover 139 which completely closes one end of the porous portion 137 from the entrance of air. The outside diameter of the annular-shaped porous portion 137 is less than the diameter of the opening 125 so that the safety filter element can be inserted into the air outlet chamber through the opening 125. The end cap 138 is provided with an outwardly directed flange 141 which will overlie the inwardly directed flange 124. The safety filter element 136 is maintained in position within the air outlet chamber 127 by bolts 142 and nuts 143 which act between the flanges 141 and 124. Preferably, the bolts 142 are secured to the flange 124 by spot welding or the like so that the bolts will remain in position upon removal of the nuts 143. A suitable seal 140 is positioned between the flanges 124 and 141 so that any air flowing from the chamber 126 to the air outlet 119 must pass through the filter paper 137.

From the FIG. 2 illustration and the above description, it can be seen that any air flowing from the air inlet 118 to the air outlet 119 must pass through a combination of two filters or two seals. Thus, if the primary filter element should rupture or its seal fail, the air would still be required to pass through the safety filter element 136 before entering the internal-combustion engine.

Service of the safety filter element 136 each time the primary filter element 128 is serviced is discouraged since the safety filter element 136 is maintained in place by the bolts 142 and nuts 143. Also, as explained in the description of FIG. 1, when service of the safety filter element is required, it will be readily apparent when the primary filter element is removed for servicing, because the primary filter element will still be relatively clean.

I claim:

1. An air cleaner comprising: an elongated cylindrical casing; said casing being closed at one end and having a removable access cover at the other end; a bulkhead having a central opening mounted within said casing intermediate the ends thereof and fixedly secured to the walls thereof; said bulkhead dividing said casing into an air inlet chamber and an air outlet chamber; said casing being provided with an air inlet opening on one side of said bulkhead adjacent said access cover and an air outlet opening on the other side of said bulkhead; a first cylindrical filter element having an open end and a closed end; first sealing means mounted on the open end of said first filter element; the outside diameter of said first filter element being larger than the opening in said bulkhead; said first filter element being positioned within said air inlet chamber with said sealing means abutting said bulkhead; a second cylindrical filter having an open end and a closed end and an outwardly extending annular flange at the open end thereof; second sealing means on said flange and on the side thereof facing the closed end of said second filter element; said second filter element having an outside diameter smaller than the opening in said bulkhead and said flange having a diameter larger than the opening in said bulkhead; said second filter element being positioned within said air outlet chamber with the flange thereon being positioned within the air inlet chamber and the second sealing means abutting said bulkhead in spaced relation to the first sealing means.

2. The air cleaner as set forth in claim 1 wherein the face of said bulkhead is stepped to provide a surface area adjacent the opening in the bulkhead which is axially offset from the surface area adjacent the walls of said casing; the flange on said second filter element overlying the axially offset area adjacent the opening in said bulkhead and the second sealing means abutting the axially offset area adjacent the opening in said bulkhead; and the sealing means on said first filter element abutting the area adjacent the walls of said casing whereby said first and second sealing means are both axially and radially offset from each other.

3. An air cleaner as set forth in claim 2 wherein said second filter element is held in position and said second sealing means is held in engagement with said bulkhead by removable retaining means acting between said flange and bulkhead and holding said flange closely adjacent said bulkhead; and said first filter element is held in position by means separate from said retaining means and urging said first filter element axially toward said bulkhead.

4. The air cleaner as set forth in claim 1 wherein said air outlet opening is provided in said casing closely adjacent to the closed end thereof and said bulkhead is mounted closely adjacent to said air outlet opening, and said first filter element is longer than said second filter element.

References Cited

UNITED STATES PATENTS

| 1,093,684 | 4/1914 | Campbell | 128—245 |
|---|---|---|---|
| 1,874,720 | 8/1932 | Wallace | 55—478 X |
| 2,068,048 | 1/1937 | Adams | 55—509 X |
| 2,096,851 | 10/1937 | Fricke | 55—509 X |
| 2,442,696 | 6/1948 | Krieck | 55—509 X |
| 2,521,107 | 9/1950 | Wiley | 55—509 X |
| 2,528,539 | 11/1950 | Norgren et al. | 55—330 X |
| 2,747,743 | 5/1956 | Talak | 210—177 |
| 2,781,913 | 2/1957 | Thompson | 210—336 |
| 2,872,043 | 2/1959 | Fitzgerald et al. | 210—307 |
| 2,883,056 | 4/1959 | Muller | 210—497 X |
| 3,048,959 | 8/1962 | Lowther | 55—459 X |

FOREIGN PATENTS

| 372,606 | 3/1923 | Germany. |
|---|---|---|
| 15,491 | 1907 | Great Britain. |
| 21,422 | 1910 | Great Britain. |
| 651,008 | 3/1951 | Great Britain. |
| 882,647 | 11/1961 | Great Britain. |
| | | (Addition to No. 67,543) |
| 1,103,754 | 10/1957 | France. |

HARRY B. THORNTON, *Primary Examiner.*

D. E. TALBERT, JR., *Assistant Examiner.*

U.S. Cl. X.R.

55—337, 500, 502, 509; 210—336